April 17, 1945.  G. E. DATH  2,373,813

SHOCK ABSORBER

Filed Sept. 24, 1943

Inventor
George E. Dath
By Henry Fuchs
Atty.

Patented Apr. 17, 1945

2,373,813

UNITED STATES PATENT OFFICE 2,373,813

SHOCK ABSORBER

George E. Dath, Chicago, Ill., assignor to W. H. Miner, Inc., Chicago, Ill., a corporation of Delaware Application September 24, 1943, Serial No. 503,604

6 Claims. (Cl. 267—9)

This invention relates to improvements in shock absorbers, especially adapted for use in connection with truck springs of railway cars for snubbing or dampening the action of the springs.

One object of the invention is to provide a shock absorber of the character indicated comprising a friction casing and a spring resisted clutch slidable within the casing, wherein the clutch is composed of a central wedge block and shoes surrounding said block and the wedge has a stem formed integral therewith for anchoring the wedge to the casing, thereby holding the parts of the mechanism assembled.

A more specific object of the invention is to provide a friction shock absorber, as described in the preceding paragraph, wherein the stem of the wedge has a T-head adapted to be interlocked with holding means on the casing by giving the wedge a partial turn about its axis and wherein the wedge is held against accidental rotation and disengagement from the casing by the cooperating engaging wedge faces of the shoes and wedge.

Other objects of the invention will more clearly appear from the description and claims hereinafter following.

Figure 1:
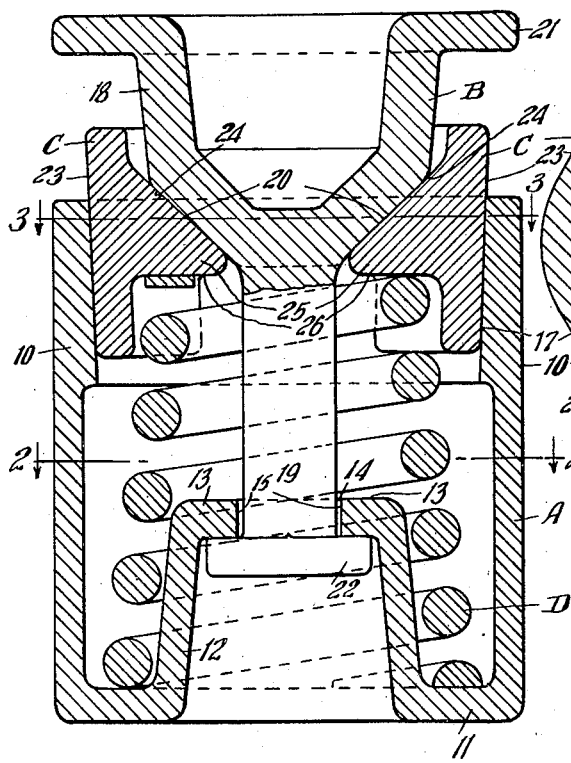
Figure 3:
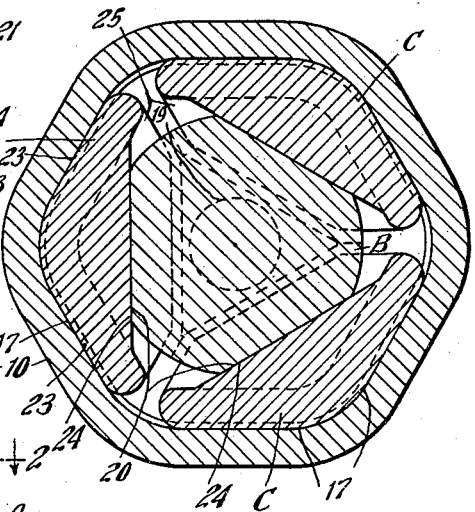
Figure 2:
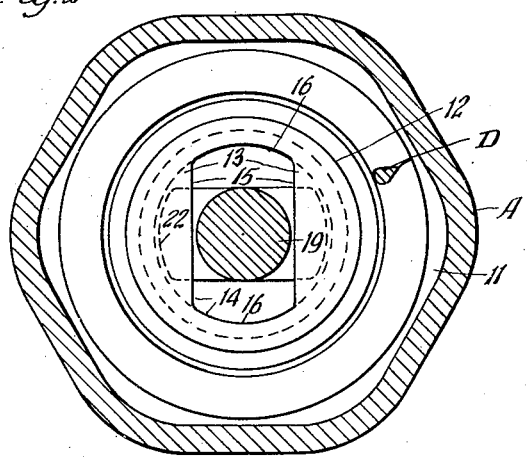

In the drawing forming a part of this specification, Figure 1 is a transverse, vertical, sectional view of the improved shock absorber, the section being on two intersecting planes at an angle of 120° to each other. Figures 2 and 3 are horizontal sectional views, corresponding respectively to the lines 2—2 and 3—3 of Figure 1.

As shown in said drawing, my improved shock absorber comprises broadly a casing A; a wedge B; three friction shoes C—C—C; and a spring resistance D.

The casing A is of substantially hexagonal interior and exterior cross section having a friction shell section 10 at the top end thereof. The casing A is closed at the bottom end by a transverse wall 11 provided with an inwardly extending, centrally located hollow boss 12. The boss 12 is of circular cross section and is slightly tapered inwardly of the casing, as shown most clearly in Figure 1, and has a transverse wall 13 at its inner end. The wall 13 is provided with an opening 14 therethrough which is in the form of a slot. As shown most clearly in Figure 2, the opening or slot 14 is laterally elongated, having substantially straight side walls 15—15 and rounded end walls 16—16. The rounded end walls are coincident with the curved side walls of the boss 12 at the inner end of the latter.

The friction shell section of the casing A is provided with six interior, substantially flat friction surfaces 17—17 which converge inwardly of the casing and are spaced symmetrically about the central longitudinal axis of the mechanism. The interior of the friction shell section thus presents six interior friction surfaces, adjacent surfaces of which are angularly disposed with reference to each other, thereby providing three pairs of surfaces, the adjacent members of each pair together forming a friction face of V-shaped transverse cross section.

The wedge B has an outer section 18 in the form of a hollow block, and an inner shank or stem section 19 by which it is anchored to the casing A, as hereinafter described. The outer section, or block 18, has three inwardly converging, flat wedge faces 20 at its inner end adapted to cooperate with the shoes C—C—C. At the outer end, the block 18 is provided with an outstanding lateral flange 21, which is continuous around the block. The flange 21 overhangs the side walls of the casing, as clearly shown in Figure 1, and is adapted to engage the end of the casing to limit inward movement of the wedge and compression of the mechanism.

The shank or stem section is of substantially cylindrical, transverse cross section and extends downwardly from the section 18 of the wedge. At the lower end the shank or stem 19 is provided with a T-head 22 of the cross section shown in Figure 2. The head 22 is of oblong shape having rounded ends similar to the opening 14 and is of such a size as to pass freely through said opening when aligned therewith, but will not pass therethrough when rotated through an arc of 90 degrees or to the position shown in Figure 2. As will be seen, when the parts are in the position shown in Figures 1 and 2, the wedge B is securely anchored to the casing A by engagement of the T-head 22 of the stem 19 with the underneath side of the wall 13 of the boss 12.

The friction shoes C—C—C, which are three in number, are interposed between the wedge B and the interior friction surfaces 17—17 of the casing, and together with the wedge form a friction clutch. Each shoe has a friction surface 23 on the outer side thereof of V-shaped, transverse cross section, which cooperates with the corresponding V-shaped friction surface of the casing formed by two adjacent surfaces 17—17 of said casing. At the inner side, that is, the side nearest the central axis of the mechanism, each shoe has a flat wedge face 24 cooperating with and correspondingly inclined to one of the wedge faces 20 of the wedge block B. The wedge faces of the shoes C are formed on lateral inward enlargements 25 on said shoes, said enlargements presenting flat transverse end faces 26 forming abutments for the top end of the spring resistance D.

The spring resistance D comprises a single coil which is contracted slightly at its upper end, as shown in Figure 1. The bottom end of the spring surrounds the boss 12 and bears on the inner side of the end wall 11 of the casing. The upper end of the spring bears on the abutment faces 26 of the shoes C.

In assembling the mechanism, the spring resistance D and the shoes C—C—C are first placed within the casing by inserting these parts through the open front end of said casing. With the casing standing on end, the shoes are forced inwardly to a predetermined extent and held in that position while assembling the wedge B with the casing. The predetermined position referred to is such that the wedge faces of the wedge will clear the wedge faces of the shoes when the wedge is passed into the casing to an extent to engage the T-head of the shank 19 in back of the wall 13 of the boss 12, that is, a position in which the wedge may be rotated about its axis without interference by the shoes. While the shoes are so held, the wedge is inserted in position, with the T-head of the shank thereof aligned with the opening 14 of the boss 12. After the T-head has been passed through the opening 14, the wedge is turned about its axis through an angle of 90 degrees, bringing the T-head into locking position in back of the wall 13. The pressure is then released from the shoes C—C—C, permitting the spring to project the same outwardly into wedging contact with the wedge faces of the wedge B. As will be evident, due to the registering condition of the wedge faces of the wedge and shoes under the pressure of the spring D, the wedge is effectively held against accidental rotation with respect to the casing, thereby preventing unlocking of the anchoring T-head of the wedge.

As is well known to those skilled in this art, my improved shock absorber or snubber replaces one or more of the spring units of a cluster of truck springs of a railway car and serves to dampen the action of the truck springs. The shock absorber is held in position by the usual centering projections on the spring follower plates which engage within the opening of the wedge B and the hollow boss 12 of the casing A.

In the operation of my improved shock absorber, upon the spring cluster of the truck of the car being compressed between the spring follower plates, the wedge B is forced inwardly of the casing A, spreading the shoes C—C—C apart and forcing them inwardly of the casing along the friction surfaces thereof against the resistance of the spring D. Frictional resistance will be thus produced to snub the action of the truck springs. Upon expansion of the coils of the truck springs, the truck spring followers are moved apart, permitting the spring D to expand and return the parts of the shock absorber to the normal release position shown in Figure 1, outward movement of the wedge B being limited by engagement of the T-head 22 of the stem of the wedge with the wall 13 of the boss 12 of the casing A.

I have herein shown and described what I now consider the preferred manner of carrying out my invention, but the same is merely illustrative and I contemplate all changes and modifications that come within the scope of the claims appended hereto.

I claim:

1. In a shock absorber, the combination with a casing open at one end and closed by a transverse wall at the other end; of a friction clutch telescoped within the casing, said clutch including a wedge member and friction shoes in wedging engagement with each other; an inwardly projecting stem on said wedge, integral therewith, said stem having shouldered engagement with the transverse wall of the casing to limit outward movement of said wedge; and spring means within the casing opposing relative movement of the clutch and casing.

2. In a shock absorber, the combination with a casing open at one end and closed by a transverse wall at the other end, said wall having an opening therethrough, said opening being elongated in transverse direction; of a friction clutch telescoped within the casing, said clutch including a wedge member and friction shoes in wedging engagement with said wedge member; an inwardly projecting stem on said wedge, said stem having a transversely elongated head at its outer end adapted to pass through said elongated opening of said end wall of the casing when said wedge is in one position, said head having shouldered engagement with said transverse wall to anchor the wedge to the casing when said wedge is turned about its axis through an angle from said position; and spring means within the casing yieldingly opposing inward movement of said clutch.

3. In a shock absorber, the combination with a casing open at one end and closed by a transverse wall at the other end, said transverse wall having an opening therethrough, said opening being elongated in transverse direction; of a wedge block, said block having a stem inwardly projecting therefrom, said stem having a transversely elongated head extending crosswise of said opening and engaging said transverse wall to anchor the wedge to said casing, said head being of a size to pass freely through said opening when registered therewith by rotation of said wedge about its longitudinal axis; friction shoes surrounding said wedge and in sliding frictional engagement with the interior walls of the casing, said wedge and shoes having cooperating wedge faces; and a spring within the casing yieldingly opposing inward movement of said shoes.

4. In a shock absorber, the combination with a casing open at one end and closed at the other end by a transverse wall, said wall having an opening therethrough, said opening being elongated in transverse direction; of a wedge block, said block having a stem inwardly projecting therefrom, said stem having a transversely elongated head extending crosswise of said opening and having shouldered engagement with said wall to anchor the wedge to the casing, said head being of a size to pass freely through said opening when registered therewith by rotation of said wedge about its longitudinal axis; friction shoes surrounding said wedge, said shoes having sliding frictional engagement with the interior of the casing, said wedge and shoes having wedging engagement on flat faces; and spring means within the casing yieldingly opposing inward movement of said shoes.

5. In a shock absorber, the combination with a casing open at one end and closed by a transverse wall at the other end, said wall having a slotted opening extending therethrough, said casing having inwardly converging, flat, interior friction surfaces; of a plurality of friction shoes having flat friction surfaces engaging the flat surfaces of the casing, said shoes having flat wedge faces on the inner sides thereof converging inwardly of the casing; a wedge block having flat, inwardly converging wedge faces in wedging engagement with the flat wedge faces of the shoes; an inwardly projecting shank on said wedge having a transversely elongated head extending crosswise of said slot and in shouldered engagement with said transverse wall of the casing to anchor the wedge to the casing, said elongated head being of a size to pass through said slot when the wedge is rotated on its axis to align said elongated head with said slot; and spring means within the casing opposing inward movement of said shoes.

6. In a shock absorber, the combination with a casing open at one end and closed by a transverse wall at the other end, said wall having a slotted opening extending therethrough, said casing having inwardly converging, interior, friction surfaces of V-shaped, transverse cross section; of a plurality of friction shoes having friction surfaces of V-shaped transverse cross section engaging the V-shaped surfaces of the casing, said shoes having flat wedge faces on the inner sides thereof converging inwardly of the casing; a wedge block having flat, inwardly converging wedge faces in wedging engagement with the flat wedge faces of the shoes; an inwardly projecting shank on said wedge having a transversely elongated head extending crosswise of said slot and in shouldered engagement with said transverse wall of the casing to anchor the wedge to the casing, said elongated head being of a size to pass through said slot when the wedge is rotated on its axis to align said elongated head with said slot; and spring means within the casing opposing inward movement of said shoes.

GEORGE E. DATH.